United States Patent
Warren

(10) Patent No.: US 7,596,372 B2
(45) Date of Patent: Sep. 29, 2009

(54) APPARATUSES AND METHODS FOR MEASURING SIGNAL STRENGTHS OF WIRELESS NETWORKS

(76) Inventor: Phillip D. Warren, 625 Millrun Ct., Macon, GA (US) 31210

( * ) Notice: Subject to any disclaimer, the term of this patent is extended or adjusted under 35 U.S.C. 154(b) by 0 days.

(21) Appl. No.: 11/153,077

(22) Filed: Jun. 14, 2005

(65) Prior Publication Data

US 2006/0014533 A1    Jan. 19, 2006

Related U.S. Application Data

(60) Provisional application No. 60/579,431, filed on Jun. 14, 2004.

(51) Int. Cl.
*H04B 17/00* (2006.01)

(52) U.S. Cl. .................. 455/423; 455/67.14

(58) Field of Classification Search .............. 455/67.11, 455/67.14, 67.13, 67.7, 423–426.1, 513, 455/115.1, 115.2, 115.3, 115.4, 552.1, 553.1
See application file for complete search history.

(56) References Cited

U.S. PATENT DOCUMENTS

| | | | |
|---|---|---|---|
| 5,396,255 A * | 3/1995 | Durkota et al. .............. 342/360 |
| 5,398,276 A | 3/1995 | Lemke et al. |
| 5,471,649 A | 11/1995 | Rees et al. |
| 5,613,217 A | 3/1997 | Hagström et al. |
| 5,734,696 A * | 3/1998 | Day ........................ 379/9.06 |
| 5,752,164 A * | 5/1998 | Jones ........................ 455/454 |
| 5,844,522 A * | 12/1998 | Sheffer et al. ............... 342/457 |
| 5,903,548 A * | 5/1999 | Delamater ................... 370/310 |
| 5,924,029 A | 7/1999 | Söhngen et al. |
| 5,987,334 A * | 11/1999 | Kaku ....................... 455/552.1 |
| 6,006,077 A | 12/1999 | Shull |
| 6,006,113 A | 12/1999 | Meredith |
| 6,134,445 A | 10/2000 | Gould et al. |
| 6,150,936 A | 11/2000 | Addy |
| 6,243,576 B1 * | 6/2001 | Seike et al. ................. 455/423 |
| 6,584,175 B1 * | 6/2003 | Kibria et al. ............... 379/1.03 |
| 6,671,331 B1 | 12/2003 | Sakuma |
| 6,720,757 B2 | 4/2004 | Khorram et al. |
| 6,836,862 B1 | 12/2004 | Erekson et al. |
| 6,925,018 B2 * | 8/2005 | Tatsumi ..................... 365/201 |
| 6,928,301 B2 * | 8/2005 | Souissi et al. ............... 455/557 |
| 6,985,495 B2 * | 1/2006 | Hoshiko .................... 370/470 |
| 7,043,268 B2 * | 5/2006 | Yukie et al. ................. 455/557 |
| 2002/0086642 A1 * | 7/2002 | Ou et al. ....................... 455/69 |
| 2002/0128037 A1 | 9/2002 | Schmidt |
| 2002/0196029 A1 * | 12/2002 | Schmidt .................... 324/500 |
| 2004/0044887 A1 * | 3/2004 | Park et al. ...................... 713/1 |
| 2005/0176420 A1 * | 8/2005 | Graves et al. ............... 455/424 |
| 2006/0121865 A1 * | 6/2006 | Frank et al. .............. 455/183.1 |
| 2006/0148526 A1 * | 7/2006 | Kamiya et al. .............. 455/566 |

OTHER PUBLICATIONS

The International Search Report for PCT/US2005/21035 mailed on Nov. 16, 2006.

* cited by examiner

*Primary Examiner*—CongVan Tran

(57) ABSTRACT

A signal tester including a controller operable to communicate with and receive signal strength data for a wireless networks corresponding to first and second modems, respectively. The tester includes a display operable to display the signal strength data for the first wireless network and the second wireless network.

18 Claims, 3 Drawing Sheets

APPARATUSES AND METHODS FOR MEASURING SIGNAL STRENGTHS OF WIRELESS NETWORKS

RELATED APPLICATION DATA

The present invention claims priority to U.S. Provisional Patent Application Ser. No. 60/579,431, titled "Wireless RSSI Tester", files on Jun. 14, 2004, the entire contents of which are incorporated by reference as if set forth fully herein.

FIELD OF THE INVENTION

This invention relates generally to wireless networks, and more particularly, to signal strength testers that allow a user to quickly and remotely view the signal strength of nearly any wireless network.

BACKGROUND OF THE INVENTION

Radio Strength Signal Indication (RSSI) is employed by mobile phones and other wireless equipment to indicate the signal strength of a wireless network received by the equipment. However, RSSI has not, to date, been used to identify signal strengths for various wireless networks, such as in a single testing device.

BRIEF SUMMARY OF THE INVENTION

A handheld tester allows a user to quickly view signal strength and network data quality parameters of nearly any wireless network. The user may therefore verify and quantify the quality of a wireless network signal at a given location. This permits the identification of signal strength prior to the installation of wireless automation equipment.

According to an embodiment of the invention, there is disclosed a signal tester. The signal tester includes a controller operable to communicate with a first wireless modem to receive signal strength data for a first wireless network in communication with the first modem, and to communicate with a second wireless modem to receive signal strength data for a second wireless network in communication with the second modem. The tester also includes at least one display operable to display the signal strength data for the first wireless network or the second wireless network.

According to one aspect of the invention, the first wireless modem may be located internal to the signal tester. According to another aspect of the invention, the second wireless modem may be located internal to the signal tester. The first wireless modem and/or second wireless modems may also be located external to the signal tester. According to yet another aspect of the invention, the at least one display is operable to display the signal strength data for the first wireless network and the second wireless network. The first wireless modem may also be operable to generate signal strength data for the first wireless network, where the first wireless network is a wide area network. Further, the second wireless modem may be operable to generate signal strength data for the second wireless network, where the second wireless network is a local area network.

According to another embodiment of the invention, there is disclosed a tester. The tester includes a universal communications interface operable to communicate with a first modem operable to generate signal strength data for a first wireless network, and to communicate with a second modem operable to generate signal strength data for a second wireless network. The tester also includes a controller coupled to the universal communications interface and operable to receive, from the universal communications interface, signal strength data generated by the first and second modems for the first wireless network and the second wireless network. The tester also includes at least one display operable to display the signal strength data for the first wireless network and the second wireless network.

According to an aspect of the invention, the tester may include an interface for coupling the universal communications interface to the first modem and the second modem. According to another aspect of the invention, the interface is capable of receiving data from only the first modem or the second modem at one time. According to yet another aspect of the invention, the first wireless modem may be located external to the tester. The second wireless modem may be located external to the signal tester.

According to yet another aspect of the invention, the at least one display may be operable to display the signal strength data for the first wireless network and the second wireless network. Furthermore, the first wireless network may be a wide area network, and the second wireless network may be a local area network. According to another aspect of the invention, the first modem may be located internal to the tester. The second modem may also be located internal to the tester. The first modem and the second modem may also be different modem types.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
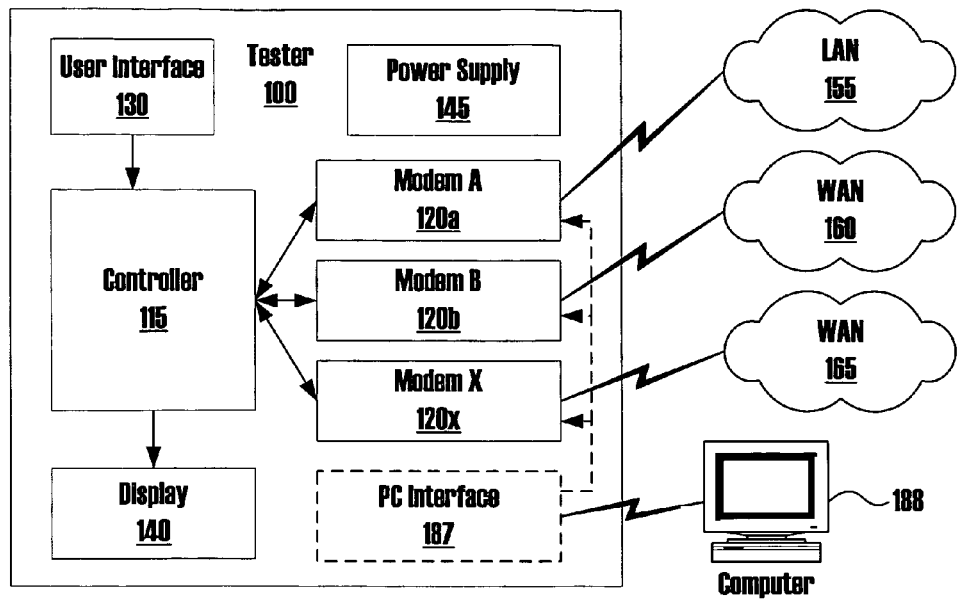
FIG. 1 is a block diagram of a wireless tester according to an illustrative embodiment of the present invention.

FIG. 1 shows a block diagram of a tester 100 according to an illustrative embodiment of the present invention. The tester 100 generally includes a controller 115, a user interface 130, a display 140, and one or more modems 120a-120x. The tester 100 also includes a power supply 145, such as a battery, to provide the required power to the controller 115, user interface 130, display 140, one or more modems 120a-120x, and other components within the tester 100.

The controller 115 controls the functioning of the tester 100, and may be a microcontroller, microprocessor, application specific integrated circuit (ASIC), or the like. Alternatively, the controller 115 may include a processor that executes instructions stored within a memory (not illustrated) of the tester 100 to effect the functions described herein. According to an embodiment of the invention, the controller 115 may be a Microchip™ PIC16F877A microcontroller, which is an eight (8) bit microcontroller having a variety of useful peripherals for communicating with other components of the tester 100.

As shown in FIG. 1, the controller 115 is operable to communicate with the one or more modems 120a-120x. According to one aspect of the invention, the communication may include AT commands utilizing an AT command set, as is known in the art. The controller 115 may also or alternatively communicate with the one or more modems 120a-120x using proprietary protocols specific to each modem 120a-120x. The controller 115 communicates with each modem 120a-120x to retrieve signal and/or network data corresponding to one or more wireless networks associated with each modem 120a-120x. For instance, as shown in FIG. 1, a first modem, modem A 120a, may be operable to receive communications from and/or to communicate with a local area network (LAN) 155, a second modem, modem B 120b, may be operable to receive communications from and/or to communicate with a first wide area network (WAN) 160, and yet another modem, modem X 120x may be able to receive communications from and/or to communicate with a second WAN 165. The signal and/or network data received by the controller 115 from each modem 120a-120x may include modem registration status, received signal strength, data link quality, signal quality, the data services available, modem IP address, modem identification, modem version, and/or the GPS coordinates of the modem. Because each of these may be determined passively via the receipt of communications from a network, including GPS coordinates determined via triangulation, the tester 100 may take the form of a receiver, rather than a transceiver operable to communicate with a wireless network.

It will be appreciated that the modems 120a-120x may include any OEM modem for communicating with wireless networks. These may include CDMA (code division multiple access) cellular modems, TDMA (time division multiple access) cellular modems, GSM/GPRS (global system mobile/general packet radio service) cellular modems, iDEN (integrated digital enhanced network) cellular modems, CDPD cellular modems, satellite modems, telephone modems, RF modems, and also wireless network interface cards and serial communications cards. Because the tester 100 may include two or more such modems, a user may be able to test a geographical area for the signal strength for multiple networks.

According to an aspect of the invention, the controller 115 may include at least one analog to digital converter (ADC) for converting analog signal and/or network data received from the one or more modems 120a-120x into digital signals. These digital signals may, in turn, be formatted for display on the display 140. The display 140 may take the form of a graphical display illustrating each of the signal and/or network parameters, and/or may include a text only display showing the user the signal and/or network parameters. For instance, according to an aspect of the present invention, the display 140 may provide a user with a signal strength for a network, e.g., WAN 160, presented to the user is decibels (dBbs). The display 140 may take the form of an LCD display 140. According to an aspect of the invention, the controller 115 may interface with the display 140 via a parallel communications bus or the like, which may be included within the controller 115.

According to an aspect of the invention, incoming signal and/or network data is continuously updated so that a user can dynamically view the signal and network parameters as the tester 100 is moved in location and/or orientation. This permits the user to gain an understanding of signal strength at any geographical location the user traverses while carrying the tester 100, which may be useful in determining the suitability of a given location for use with a particular modem type. For instance, this information may be useful in determining where to place hardware utilizing such wireless networks, or what type of modem should be used for a particular location, such as a power meter using one or more wireless networks for communication. As another example, this information may also be helpful in determining where additional relays are needed to improve weak signal areas or to fill in holes or gaps of wireless network coverage.

The user interface 130 of the tester 100 may be used by the user to scroll through or to otherwise select the signal and/or network data presented on the display 140. For instance, where the tester 100 include a plurality of modems each in communication with different networks, the user may use the user interface 130 to select which network the user wishes to view signal and/or network data for. Additionally, the user may utilize the user interface 130 to set audible alarms to indicate signal strength so that the user can listen to the tester 100 while traversing a geographical area. Thus, the tester 100 may also include at least one speaker in addition to the display 100.

As is also shown in FIG. 1, the tester 100 may also communicate with a computer 188, such as via a PC interface 187. The PC interface 187 is illustrated with dashed lines, as it is an optional component within the tester 100. The interface 187 allows the computer 188, such as a personal computer, to communicate with the one or more modems 120a-120x directly, independent of the controller 115. This may permit the computer 188 to program the one or more modems 120a-120x. According to another aspect of the invention, the tester 100 may store signal and/or network data within a memory within the tester 100, such as within a flash memory, RAM, ROM, or the like, so that the data may be downloaded to the computer 188 or to another device, either directly or wirelessly.

It will be appreciated that the embodiment illustrated in FIG. 1 is an illustrative and non-limiting example of a tester 100 according to the present invention. Thus, the tester may be implemented with a greater or fewer number of modems than are illustrated in the embodiment shown in FIG. 1. Further, it will be appreciated that the tester 100 may include additional hardware and/or software, as is known in the art, to implement one or more of the functions described herein. For instance, the tester 100 may include one or more antennas in communication with the one or more modems 120a-120x for communicating with wireless networks.

Figure 2:
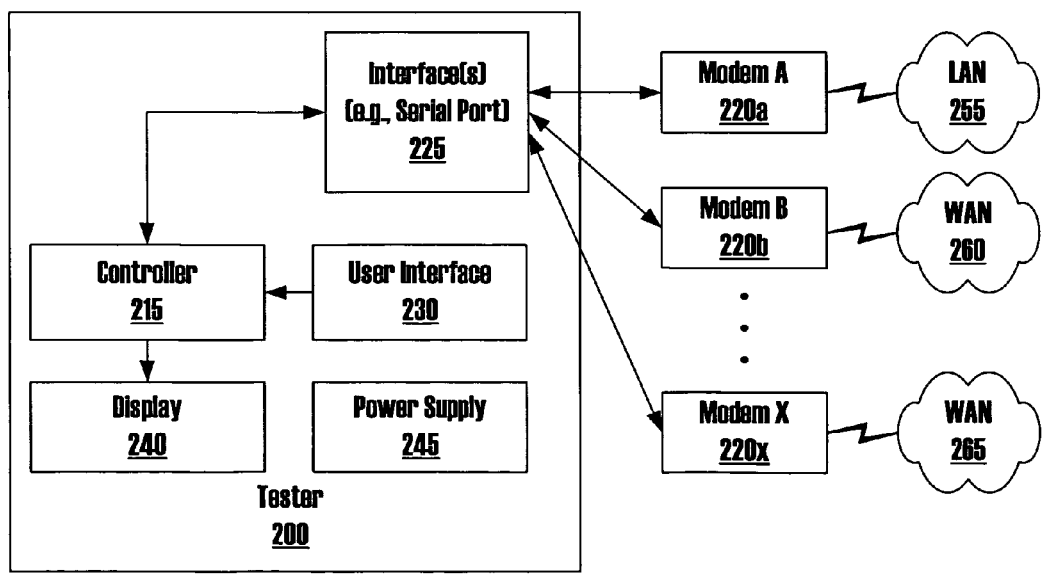
FIG. 2 is a block diagram of a wireless tester according to another illustrative embodiment of the present invention.

Next, FIG. 2 shows a block diagram of a wireless tester 200 according to another illustrative embodiment of the present invention. The wireless tester 200 of FIG. 2 is similar to the wireless tester 100 of FIG. 1 in that it includes a controller 215, a user interface 230, a power supply 245, and a display 240. Each of those components may be similar to those described above with respect to FIG. 1. However, unlike the tester 100 of FIG. 1, the tester 200 shown in FIG. 2 includes one or more interfaces 225 by which external modems 220a-220x may be connected to the tester 200. According to an aspect of the invention, the one or more interfaces 225 may include a serial port and/or a PCMCIA slot to which a PCMCIA card may be connected. Like the embodiment described with respect to FIG. 1, the one or more modems 220a-220x may be in communication with one or more respective networks 255, 260, 265.

According to one aspect of the invention, the controller 215 of the tester 200 may be configured for one or more modems 220a-220x, where the controller 215 includes separate interfaces for each external modem 220a-220x attached to the tester. Alternatively, the controller 215 may be configured to communicate with a particular type of modem by a user, such as via a selection of the modem type using the display 240, or via the selection of the modem type using the user interface 230. This enables the tester 200 to be utilized regardless of the type of modem connected to the tester 200.

Figure 3:
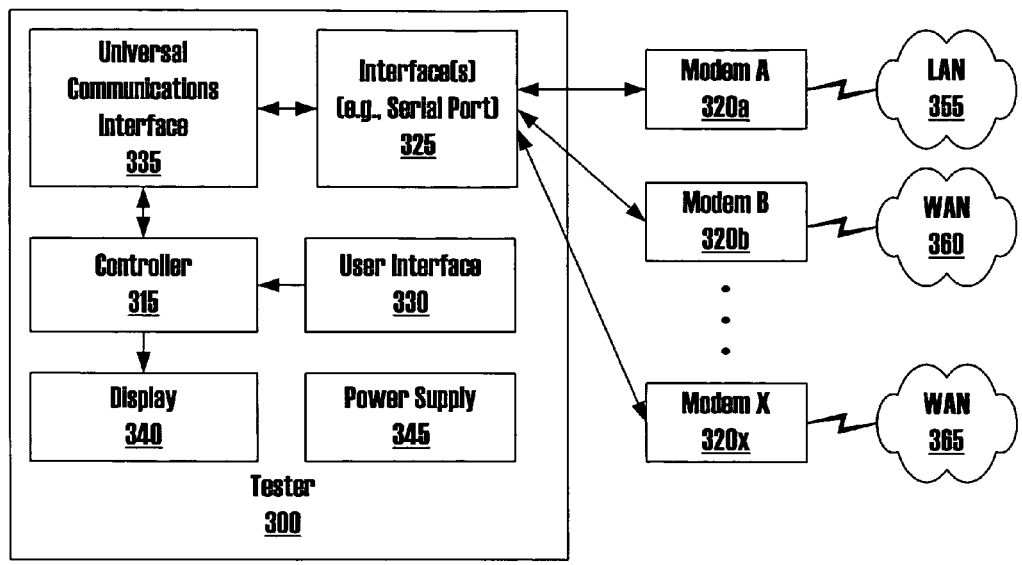
FIG. 3 is a block diagram of a wireless tester according to another illustrative embodiment of the present invention.

Next, FIG. 3 shows a block diagram of a tester 300 according to yet another illustrative embodiment of the present invention. The tester 300 of FIG. 3 is similar to the tester 200 described with respect to FIG. 2. Therefore, the tester 300 includes a controller 315, a display 340, a power supply 345, a user interface 330, and one or more interfaces 325 in communication with one or more external modems 320a-320x, which are in communication, respectively, with one or more networks 355, 360, 365.

However, the wireless tester 300 of FIG. 3 also includes a universal communications interface 335 positioned in between the one or more interfaces 325 and the controller 315. In particular, the universal communications interface 335 is operable to provide plug and play capability to such that the tester 300 may work regardless of the type of modem attached to it. Additionally, although the embodiment shown in FIG. 3 illustrates the modems 320a-320x as being external to the tester 300, it will also be appreciated that the modems 320a-320x may be included within the device 300.

According to an aspect of the invention, the universal communications interface 235 enables the use of a variety of modems 220a-220x within the modem without altering the controller 215, interfaces 325, or any settings of the tester 300. Thus, the tester 300 may only include a single interface 325 to which a variety of modems types, including those described with respect to FIG. 1, may be attached.

According to an illustrative example, the universal communications interface 335 may send and receive data, including signal and network data, to and from a modem 320a-320x connected to the tester 300, via ports or slots of the one or more interfaces 325. Modems may be coupled to the slots or ports of the one or more interfaces 325 in any well known manner, such as through use of a circuit board or "card", a multi-prong connector (either male or female), a coaxial jack, or other manners apparent to those skilled in the art. The universal communications interface 335 may sends and receives data to and from the controller 315 via a universal bus (not illustrated), such as a 4-bit parallel bus. This allows the tester 300 to transfer information from one or more modems 320a-320x to the controller 315 simultaneously from the universal communications interface 335. Additionally, the universal bus may multiplex data transmissions originating from multiple modems 320a-320x. Thus, the bus may simultaneously transmit signal and network data to or from up to four modems 320a-320x connected to the universal communications interface 335. In alternate embodiments, the universal bus 234 may be an 8-bit bus, 16-bit bus, or bus of any other size without departing from the spirit and scope of the present invention.

The universal communications interface 335 may also comprise such components as a clock, shift registers, multiplexers, and the like for facilitating the transfer of data between the various types of modems and the controller 315. The universal communications interface 335 may include its own processor and non-volatile storage or may be controlled by the controller 315 and utilize the non-volatile storage of the tester 300. Plug-and-play software or firmware may be stored in a non-volatile storage for enabling the universal communications interface 335 to recognize a modem that is plugged into the interface 325.

The tester of FIG. 3 permits a user to plug any type of modem into the tester 300 without reconfiguring the tester 300, due to the plug and play capabilities provided by the universal communications interface 335. Therefore, a user may utilize the tester 300 to test geographic area using one or more modems. This may be advantageous where a tester may be used to test disparate networks, as the tester may be manufactured at a low cost as a result of it not requiring customization for a particular modem, or multiple types of modems integrated within it.

Figure 4:
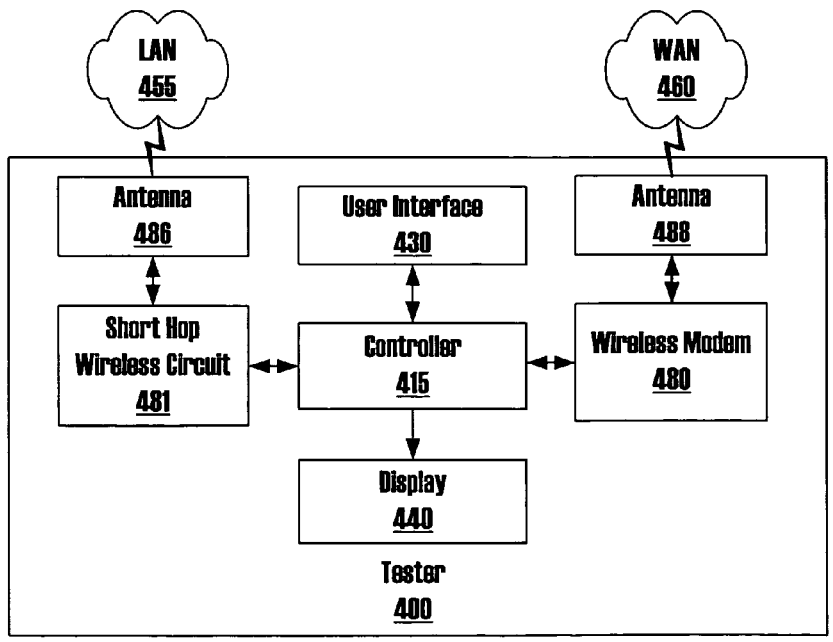
FIG. 4 is a block diagram of a wireless tester according to another illustrative embodiment of the present invention.

FIG. 4 is a block diagram of a tester 400 according to another illustrative embodiment of the present invention. The tester of FIG. 4 includes a controller 415, display 440, and user interface 430 similar to those described above with reference to FIG. 1. As shown in FIG. 4, the tester 400 also include a wireless modem 480 and a short hop wireless circuit 481 that are respectively attached to antenna 486, 488. According to an aspect of the invention, the wireless modem 480 is operable to communicate, via the antenna 488, with a WAN 460, and to relay signal and network data to the controller 415 for display via the display 440. Additionally, the short hop wireless circuit 481 may be operable to communicate, via its associated antenna 486, with a LAN 455, and to relay signal and network data to the controller 415 for display via the display 440. According to an aspect of the invention, the LAN 455 that may be identified by the short hop wireless circuit 480 may include Bluetooth® device or network. As such, the illustrative tester 400 shown in FIG. 4 may be used to simultaneously view the signal and/or network data for each, or may be required to toggle between the information from each using the user interface 430.

Figure 5:
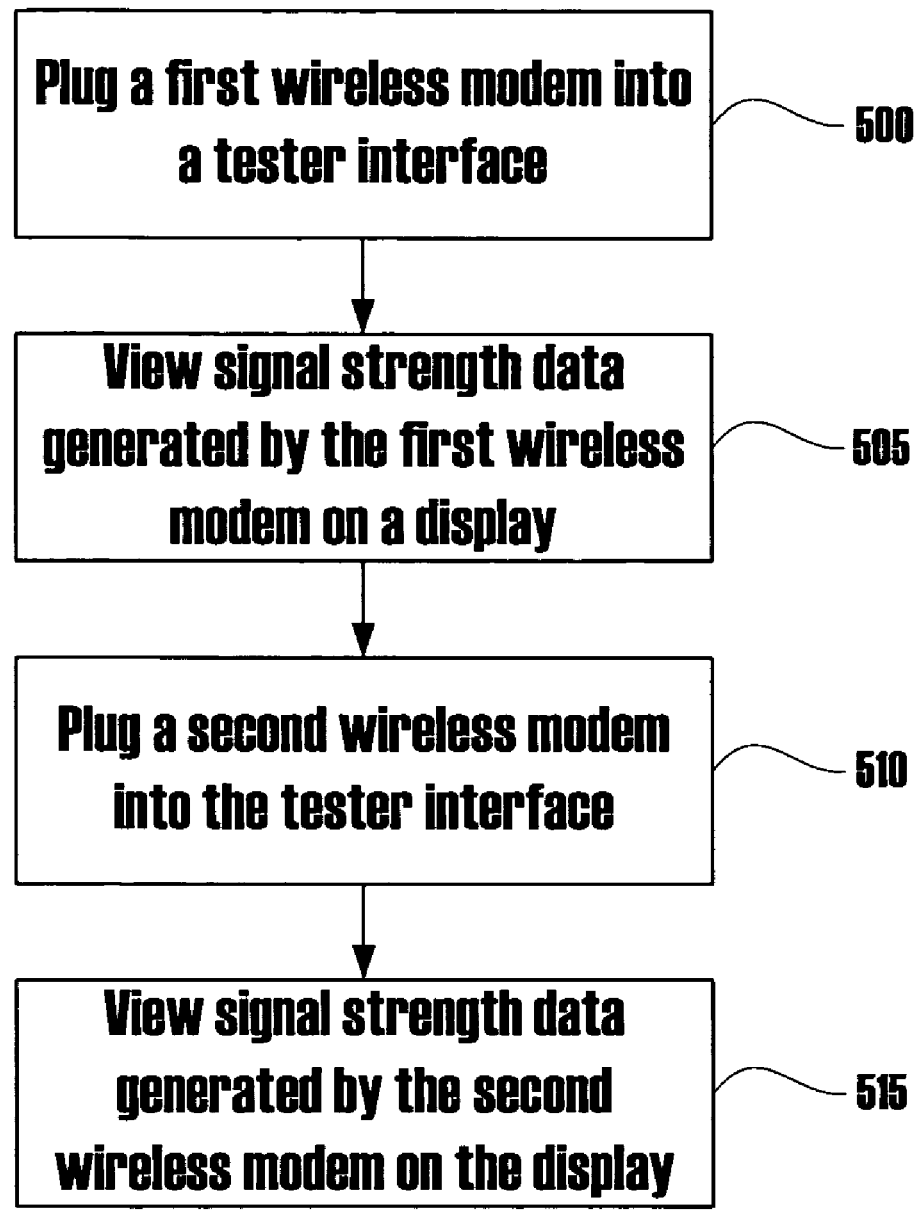
FIG. 5 is a block diagram flow chart illustrating the use of a wireless tester according to the present invention.

FIG. 5 is a block diagram flow chart illustrating the use of a wireless tester according to the present invention. Because the testers of the present invention enable the plug and play operation of multiple modems, a user may plug a first wireless modem into an interface of a tester (block 500) and view the signal strength data generated by the first wireless modem (block 505). Thereafter, the user may plug a second wireless modem into the interface of the tester (block 510) and view the signal strength data generated by the second wireless modem (block 515).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A signal tester, comprising:
 a controller, wherein the controller is operable to:
 receive first signal strength data from a first wireless modem for a first wireless network in communication with the first wireless modem; and
 receive second signal strength data from a second wireless modem for a second wireless network in communication with the second wireless modem;

at least one display operable to selectively display the first signal strength data and the second signal strength data or to simultaneously display the first signal strength data and the second signal strength data; and at least one memory operable to store the first signal strength data and the second signal strength data for communication to an external device.

2. The signal tester of claim 1, wherein at least one of the first wireless modem and the second wireless modem is located internal to the signal tester.

3. The signal tester of claim 1, wherein at least one of the first wireless moden and the second wireless modem is located external to the signal tester.

4. The signal tester of claim 1, wherein the first wireless modem is operable to generate the first signal strength data for the first wireless network, and wherein the first wireless network is a wide area network.

5. The signal tester of claim 4, wherein the second wireless modem is operable to generate the second signal strength data for the second wireless network, and wherein the second wireless network is a local area network.

6. The signal tester of claim 1, wherein the controller is further operable to receive network data associated with one of the first wireless network and the second wireless network;
wherein the received network data comprises a current location of at least one of the first wireless modem and the second wireless modem.

7. The signal tester of claim 6, wherein the current location comprises a global positioning system location.

8. A tester, comprising:
a universal communications interface operable to:
communicate with a first modem operable to generate first signal strength data for a first wireless network; and
communicate with a second modem operable to generate second signal strength data for a second wireless network;
a controller coupled to the universal communications interface and operable to receive, from the universal communications interface, the first signal strength data generated by the first modem and the second signal strength data generated by the second modem;
at least one display operable to selectively display the first signal strength data and the second signal strength data or to simultaneously display the first signal strength data and the second signal strength data; and
at least one memory operable to store the first signal strength data and the second signal strength data for communication to an external device.

9. The tester of claim 8, further comprising an interface for coupling the universal communications interface to the first modem and the second modem.

10. The tester of claim 9, wherein the interface is capable of receiving signal strength data from only the first modem or the second modem at one time.

11. The tester of claim 9, wherein at least one of the first modem and the second modem is located external to the tester.

12. The tester of claim 9, wherein the first wireless network is a wide area network.

13. The tester of claim 12, wherein the second wireless network is a local area network.

14. The tester of claim 9, wherein at least one of the first modem and the second modem is located internal to the tester.

15. The tester of claim 8, wherein the first modem and the second modem are of different types.

16. The tester of claim 8, wherein the controller is further operable to receive network data associated with one of the first wireless network and the second wireless network;
wherein the received network data comprises a current location of at least one of the first modem and the second modem.

17. The tester of claim 16, wherein the current location comprises a global positioning system location.

18. A signal tester, comprising:
a controller, wherein the controller is operable to:
receive first signal strength data and first wireless network data from a first wireless modem for a first wireless network in communication with the first modem; and
receive second signal strength data and second network data from a second wireless modem for a second wireless network in communication with the second wireless modem; and
at least one display operable to selectively display the first signal strength data and the network data and the second signal strength data or to simultaneously display the first signal strength data and the second signal strength data;
wherein the received first or second network data comprises a current location of at least one of the first wireless modem and the second wireless modem.

* * * * *